(12) United States Patent
Elmofty

(10) Patent No.: US 10,232,898 B2
(45) Date of Patent: Mar. 19, 2019

(54) SELF-LOCKING CLAMP APPARATUS AND METHODS OF USE THEREOF

(71) Applicant: Honda Motor Co., Ltd., Tokyo (JP)

(72) Inventor: Omar Serag Elmofty, Alliston (CA)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 15/642,160

(22) Filed: Jul. 5, 2017

(65) Prior Publication Data

US 2019/0009847 A1    Jan. 10, 2019

(51) Int. Cl.
   B62D 65/02  (2006.01)
   B66C 1/44   (2006.01)

(52) U.S. Cl.
   CPC ......... B62D 65/022 (2013.01); B62D 65/024 (2013.01); B66C 1/447 (2013.01)

(58) Field of Classification Search
   CPC .... B62D 65/022; B62D 65/024; B66C 1/447; B25J 15/009; B25J 15/0047; B25J 15/0061; B23Q 1/70; B23P 19/04
   USPC ....... 29/281.1, 281.3, 281.5; 269/58, 56, 59, 269/66, 68, 74, 90, 166
   See application file for complete search history.

(56) References Cited

U.S. PATENT DOCUMENTS

| | | | |
|---|---|---|---|
| 2,803,872 A * | 8/1957 | Massa ................. | B25H 1/0007 269/106 |
| 3,211,490 A | 10/1965 | Gardner et al. | |
| 3,493,260 A | 2/1970 | Smith | |
| 4,167,996 A | 9/1979 | Cutter | |
| 4,589,184 A * | 5/1986 | Asano ................. | B25J 9/0093 198/575 |
| 4,685,713 A | 8/1987 | Van Der Hulst et al. | |
| 6,000,686 A * | 12/1999 | Yates ................. | B25B 5/12 269/143 |
| 6,024,348 A * | 2/2000 | Ventura ............... | B05B 13/0285 269/104 |
| 6,112,390 A | 9/2000 | Takeda et al. | |
| 6,619,905 B2 | 9/2003 | Stahler | |
| 6,910,254 B2 * | 6/2005 | Aoki ................... | B62D 25/04 29/281.1 |

(Continued)

FOREIGN PATENT DOCUMENTS

| | | |
|---|---|---|
| DE | 10042971 A1 | 3/2002 |
| JP | 2010264855 A | 11/2010 |

*Primary Examiner* — George B Nguyen
(74) *Attorney, Agent, or Firm* — Kenealy Vaidya LLP

(57) ABSTRACT

Some embodiments are directed to a clamp assembly for use with an air balancer for clamping a vehicle panel. The clamp assembly can include an upright member and a base member configured to engage the vehicle panel from a first side. The clamp assembly can include a first and third linkage connected to the upright member. The clamp assembly can include a second linkage defining a hook and being connected to the upright member. The clamp assembly can include a fourth linkage connected to the upright member with a lever connected to thereto and configured to rotate the fourth linkage. The clamp assembly can include a clamp member connected to the second and fourth linkages and configured to engage the vehicle panel from a second side. The clamp assembly can include a balance member having a locking protrusion and being connected to the first linkage and the third linkage.

20 Claims, 6 Drawing Sheets

(56) References Cited

U.S. PATENT DOCUMENTS

| | | | | |
|---|---|---|---|---|
| 7,243,904 B1* | 7/2007 | Grimes | ............... | B66C 23/48 |
| | | | | 254/2 B |
| 7,377,503 B2* | 5/2008 | Yajima | ............... | B23K 37/0443 |
| | | | | 269/152 |
| 7,380,849 B2 | 6/2008 | Mongan | | |
| 7,900,898 B2* | 3/2011 | Wampler, II | ............... | B23Q 3/069 |
| | | | | 269/152 |
| 8,047,591 B2 | 11/2011 | Hwang | | |
| 8,128,078 B2* | 3/2012 | Ochiai | ............... | B23H 9/10 |
| | | | | 269/287 |
| 8,132,310 B2* | 3/2012 | Suga | ............... | B62D 65/06 |
| | | | | 269/37 |
| 8,322,005 B2* | 12/2012 | Buse | ............... | B23P 19/047 |
| | | | | 29/235 |
| 8,677,603 B1* | 3/2014 | Reynolds | ............... | A01G 23/10 |
| | | | | 29/237 |
| 2001/0032772 A1* | 10/2001 | Oldford | ............... | B62D 65/18 |
| | | | | 198/345.3 |
| 2005/0102816 A1* | 5/2005 | Ziegmann | ............... | A47B 88/423 |
| | | | | 29/468 |
| 2017/0050323 A1* | 2/2017 | Shi | ............... | B25J 15/0047 |

\* cited by examiner

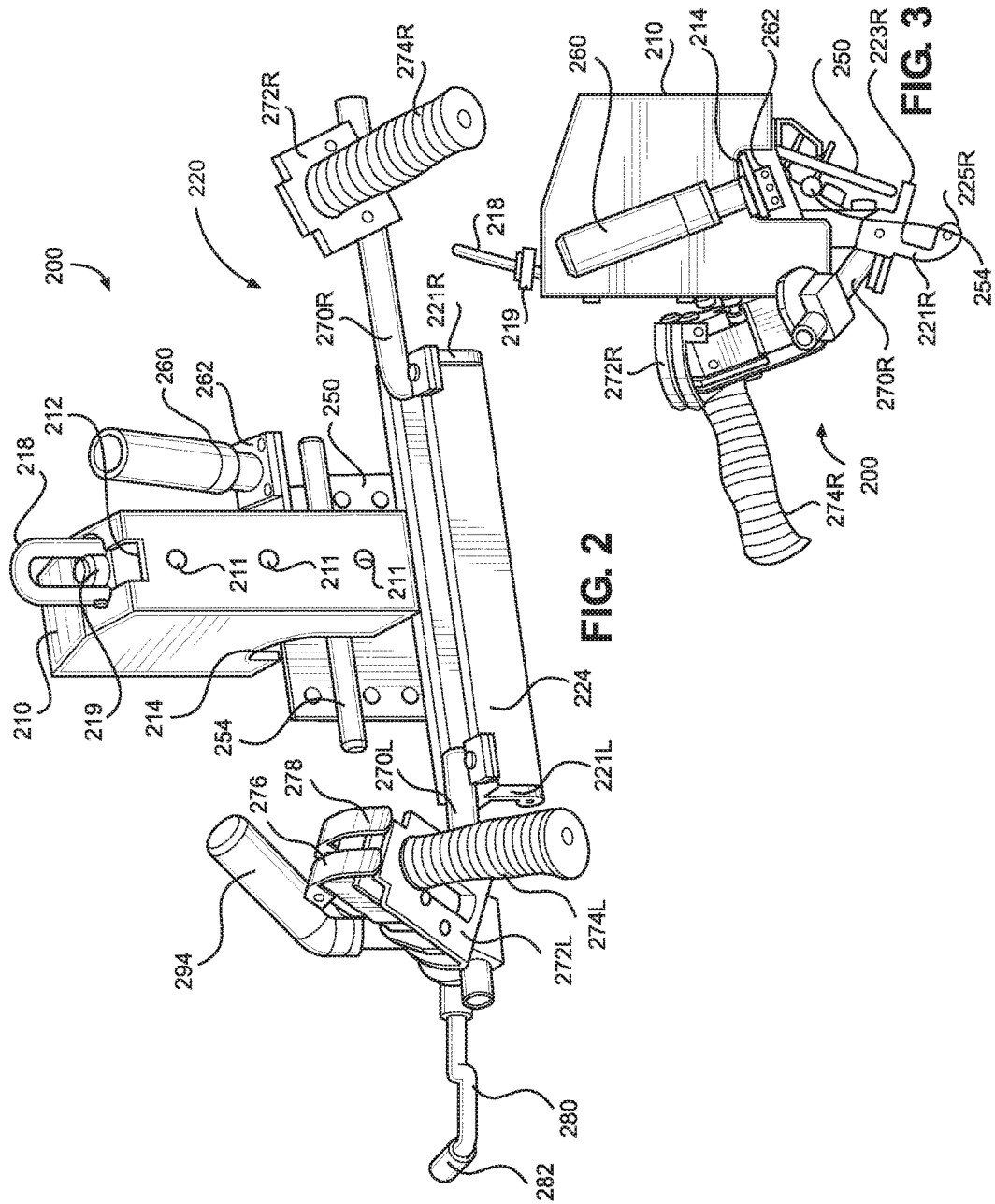

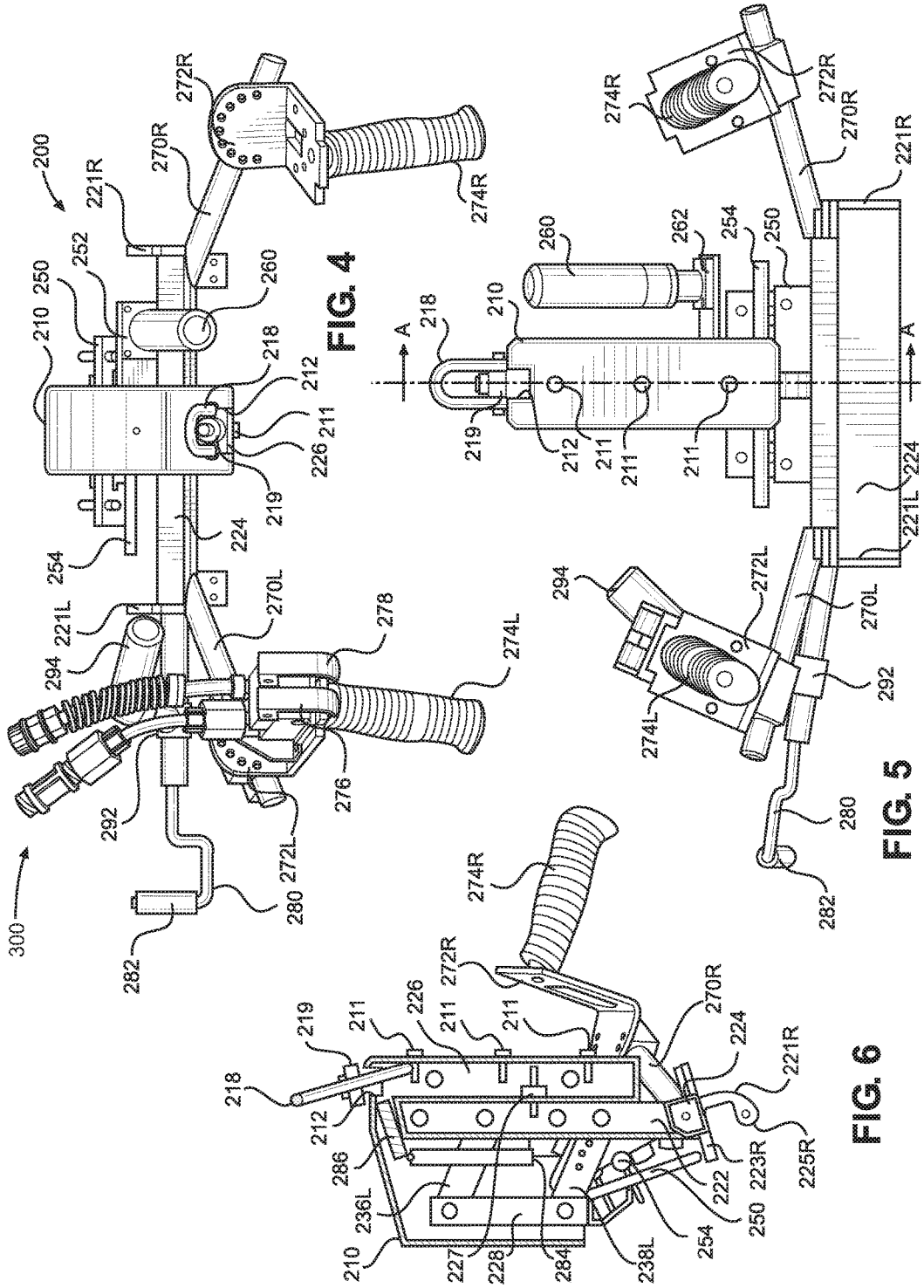

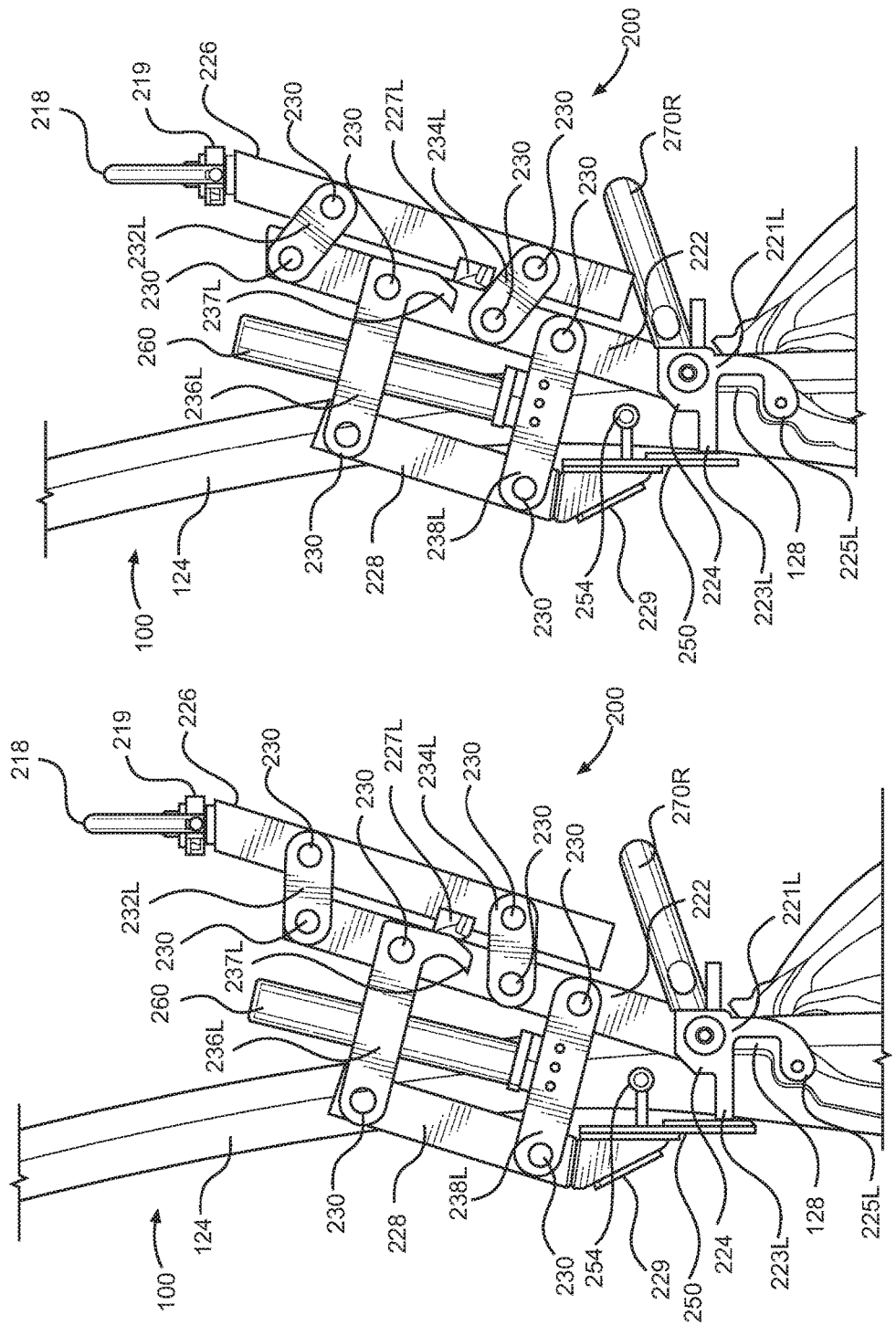

SELF-LOCKING CLAMP APPARATUS AND METHODS OF USE THEREOF

BACKGROUND

The disclosed subject matter relates to self-locking clamp apparatus, and methods of use and manufacture thereof. More particularly, the disclosed subject matter relates to methods and apparatus that clamp to vehicle panels during assembly to facilitate lifting and positioning of the panels.

Vehicle panel fitment assist processes, particularly door lift assist processes, provide ergonomic means of lifting and installing heavy components on a vehicle. Lift mechanisms are used to position doors on the vehicle, and these door lift mechanisms can have clamps that secure the door to the lift mechanism to facilitate accurate positioning. Clamp structure can affect integrity of the connection to the door to enhance positioning accuracy and ergonomics.

SUMMARY

According to one aspect, a clamp assembly for use with an air balancer configured to clamp to a vehicle panel during assembly can be provided. The clamp assembly can include a base member configured to engage the vehicle panel from a first side. The clamp assembly can also include an upright member extending from the base member away from the vehicle panel. The clamp assembly can further include a first linkage rotatably connected to the upright member. The clamp assembly can further include a second linkage defining a hook and being rotatably connected to the upright member the first linkage. The clamp assembly can further include a third linkage rotatably connected to the upright member the second linkage. The clamp assembly can further include a fourth linkage rotatably connected to the upright member the third linkage. The clamp assembly can further include an actuable lever connected to the fourth linkage and configured to rotate the fourth linkage about the upright member. The clamp assembly can further include a clamp member connected to the second linkage and the fourth linkage and configured to engage the vehicle panel from a second side opposing the first side upon actuation of the lever. The clamp assembly can further include a balance member having a locking protrusion and being rotatably connected to the first linkage and the third linkage and configured to be connected to the air balancer, the locking protrusion configured to engage the hook of the second linkage upon pressurizing the air balancer.

According to another aspect, a clamp system for clamping a vehicle panel during assembly can be provided. The clamp system can include an air balancer configured to be pressurized and depressurized. The clamp assembly can also include a base member configured to engage the vehicle panel from a first side. The clamp assembly can further include an upright member extending from the base member away from the vehicle panel. The clamp assembly can further include a first linkage rotatably connected to the upright member. The clamp assembly can further include a second linkage defining a hook and being rotatably connected to the upright member the first linkage. The clamp assembly can further include a third linkage rotatably connected to the upright member the second linkage. The clamp assembly can further include a fourth linkage rotatably connected to the upright member the third linkage. The clamp assembly can further include an actuable lever connected to the fourth linkage and configured to rotate the fourth linkage about the upright member. The clamp assembly can further include a clamp member connected to the second linkage and the fourth linkage and configured to engage the vehicle panel from a second side opposing the first side upon actuation of the lever. The clamp assembly can further include a balance member having a locking protrusion and being rotatably connected to the first linkage and the third linkage and configured to be connected to the air balancer, the locking protrusion configured to engage the hook of the second linkage upon pressurizing the air balancer.

According to yet another aspect, a method of clamping a vehicle panel can include: providing a clamp assembly in an open position, the clamp assembly having an air balancer that can be pressurized and depressurized; aligning a first side of the vehicle panel with a first side of the clamp assembly; depressurizing the air balancer, causing a second side of the clamp assembly to automatically engage a second side of the vehicle panel; and pressurizing the air balancer, causing the clamp assembly to lock in the closed position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 2 is a perspective view of the clamp assembly removed from the door.

FIG. 3 is a perspective view of a side of the clamp assembly.

FIG. 4 is a perspective view of a top of the clamp assembly.

FIG. 5 is a perspective view of a front of the clamp assembly.

FIG. 6 is a cross-section view of a side of the clamp assembly of FIG. 5.

FIG. 7A is a side view of the clamp assembly without a cover in a first stage of coupling.

FIG. 7B is a side view of the clamp assembly without a cover in a second stage of coupling.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview

Figure 1:
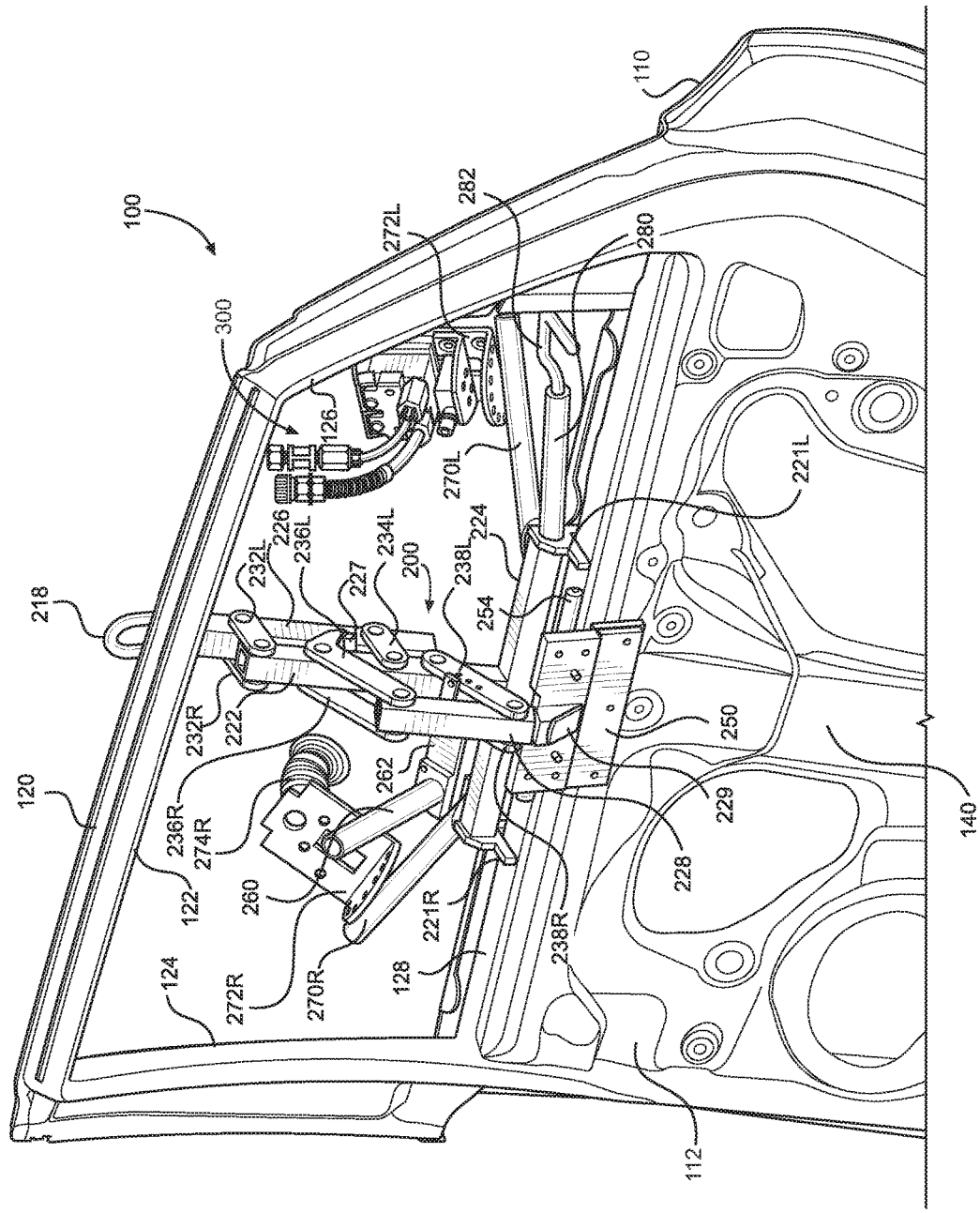
FIG. 1 is a perspective view of a clamp assembly secured to a vehicle door in accordance with the disclosed subject matter.

FIG. 1 is a perspective view of a clamp assembly 200 secured to a vehicle door 100 in accordance with the disclosed subject matter. The exemplary door 100 includes a window frame 120 extending from a door panel 140. The window frame 120 includes an upper sill 122, side sills 124,126 and a lower sill 128 that define an opening. As will be described below, the clamp assembly 200 is configured to engage the lower sill 128 of window frame 120. Specifically, the clamp assembly 200 is positioned on the lower sill 128 from an exterior facing side 110 of the door 100.

The clamp assembly 200 of the current embodiment is shown without a cover 210 (shown in FIG. 2) and in a locked state engaged with the door 100 in FIG. 1. The clamp assembly 200 includes a support structure 220 with an upper member 222 joined to a lower member 224. As will be described below, the lower member 224 is configured to engage the sill 128 on an exterior facing side 110 of the door 100.

The upper member 222 is connected to a balance member 226 by a pair of upper balance links 232L,R and a pair of lower balance links 234L,R. The upper member 222 is additionally connected to a clamp member 228 by a pair of locking links 236L,R and a pair of lever links 238L,R that have a lever bracket 262 and lever handle 260 attached thereto. The clamp member 228 has a mounting extension 229 to which a guard plate 250 is attached. As will be described below, the guard plate 250 is configured to engage the sill 128 on an interior facing side 112 of the door 100.

The lower member 224 has a pair of handle stalks 270L,R extending therefrom that support a pair of handle grips 274L,R. The handle grips 274L,R are configured to be gripped from an exterior facing side 110 of the door 100.

The lower member 224 has a datum bar 280 with a collar 282 extending therefrom. The datum 280 bar and the collar 282 are configured to contact the side sill 126.

The balance member 226 has a ring 218 attached thereto for supporting the clamp assembly 200. The ring 218 can be attached to a support member such as a chain, or beam or cable, from which the clamp assembly 200 can hang overhead. The balance member 226 is also configured to be connected to an air balancer which may be pressurized and depressurized to support the clamp assembly 200 by the ring 218, or alternatively release the clamp assembly 200 from support.

II. Clamp Assembly

FIG. 2 is a perspective view of the clamp assembly 200 removed from the door 100. The clamp assembly 200 of the current embodiment is shown with the cover 210. The cover 210 is a shell that fits over the support structure 220, the balance member 226 and the clamp member 228. The cover 210 includes a lower opening 214 through which the support structure 220, the balance member 226 and the clamp 228 can be inserted to be at least partially surrounded by the cover 210. The cover 210 also includes an upper slot 212 through which the ring 218 can be inserted upon covering the support structure 220, the balance member 226 and the clamp 228 with the cover 210. A connection between the ring 218 and the balance member 226 incorporates a bushing 219. However, other embodiments may not include the bushing 219. The cover 210 is connected to the balance member 226 by fasteners 211. Other embodiments may not include the fasteners 211 and the cover 210 can instead be connected to the balance member 226 by clips, adhesives, etc.

The lower opening 214 of the cover 210 includes cutouts accommodating the guide plate 250. The guide plate 250 has a secure bar 254 extending therefrom towards the interior facing side 112 of the door 100, particularly at the lower sill 128.

As will be described below, the lever handle 260 is configured to be actuable between clamped (closed) and unclamped (open) positions to thereby place the clamp assembly 200 in clamped and unclamped states, respectively.

The lower member 224 has end plates 221L,R which are configured to engage the lower sill 128 from the exterior facing side 110 of the door 100. The handle stalks 270L,R may be an integral aspect of the lower member 224 or separate components coupled to the lower member 224. The handle stalks 270L,R extend outward from the lower member 224 and support handle brackets 272L,R. The handle grips 274L,R are connected to the handle brackets 272L,R. The handle stalks 270L,R, the handle brackets 272L,R and the handle grips 274L,R may be separate components operably coupled together as described above, or alternatively, may be integrally formed together in any combination that allows the clamp assembly 200 to function as described herein.

The handle bracket 272L of the present embodiment supports first and second switches 276,278. As will be described below, the first and second switches 276,278 are configured to pressurize and depressurize the air balancer to support and release the clamp assembly 200.

The handle stalk 270L of the present embodiment support a handle bracket 292 to which a handle grip 294 is connected. The handle grip 294 extends toward the support structure 220.

FIG. 3 is a perspective view of a side of the clamp assembly 200. As shown in FIG. 3, the lever handle 260 is in the unclamped position and the clamp assembly 200 is therefore in the unclamped state. In the unclamped position, the lever handle 260 is angled toward the handle grip 274L (the handle grip 274R is not shown).

The end plate 221R of the lower member 224 is approximately C-shaped with a guide portion 223R defining a planar surface and a clasp portion 225R extending downward therefrom. As will be described below, the end plate 221R is configured to engage the lower sill 128 from the exterior facing side 110 of the door 100.

FIG. 4 is a perspective view of a top of the clamp assembly 200. As shown in FIG. 4, the lever handle 260 is in the unclamped position and the clamp assembly 200 is therefore in the unclamped state.

The handle grips 274L,R extend from the lower member 224 by the handle stalks 270L,R. The handle brackets 272L,R by which the handle grips 274L,R are mounted have mounting settings to adjust placement of the handle grips 274L,R along the stalks 270L,R. The handle grips 274L,R can be adjusted for a variety of reasons including operator preferences, workpiece dimensions, etc. The first and second switches 276,278 are also mounted on the handle bracket 272L. As will be described below, the first and second switches 276,278 are configured to pressurize and depressurize the air balancer. The first and second switches 276, 278 may be buttons, knobs, etc.

FIG. 5 is a perspective view of a front of the clamp assembly 200. As shown in FIG. 5, the lever handle 260 is in the unclamped position and the clamp assembly 200 is therefore in the unclamped state.

FIG. 6 is a cross-section view of a side of the clamp assembly 200 of FIG. 5. In FIG. 6, orientation of the support structure 220 with the balance member 226 and the clamp member 228 is shown under the cover 210 for the unclamped state of the clamp assembly 200. Relative positions of the locking link 236L and the lever link 238L are also shown for the unclamped state.

The clamp assembly of the present embodiment includes a spring 284 and a spring block 286 connected to the support structure 220 for moving the clamp assembly 200 into the locked and the unlocked states upon pressurizing or depressurizing the air balancer.

III. Operation

FIG. 7A is a side view of the clamp assembly 200 without the cover 210 in a first stage of coupling to the door 100. As shown in FIG. 7A, the clamp assembly 200 is first aligned with the lower sill 128 of the door 100.

The clamp assembly 200 is supported by the ring 218 connected to the balance member 226 so that it may be moved relative to the door 100. With the air balancer pressurized, weight of the clamp assembly 200 is substantially supported by the ring 218, facilitating ergonomic movement of the clamp assembly 200. The clamp assembly 200 is maneuvered by the handle grips 274L,R to be brought into the window frame 120 from the exterior facing side 110 of the door 100. Once in the window frame 120, the lower member 224 of the support structure 220 is brought into contact with the lower sill 128. Specifically, the guide portion 223L is aligned with a planar surface of the lower sill 128, and the clasp portion 225L is slid into a concave portion of the lower sill 128. The lower member 224 is thus fitted to the lower sill 128. In this stage, locking block 227 and hook 237 hold the clamp member 228 in the unclamped state. At the first stage of coupling, the lever handle 260 remains in the unclamped position.

FIG. 7B is a side view of the clamp assembly 200 without a cover 210 in a second stage of coupling to the door 100. As shown in FIG. 7B, the balance member 226 is allowed to lower and the clamp assembly 200 rests on the door 100.

As described above, the clamp assembly 200 was supported at the ring 218 when the air balancer was pressurized. However, at this stage of coupling, the air balancer is depressurized so that weight of the clamp assembly 200 is substantially released at the ring 218, causing the clamp assembly 200 to rest on the door 100. Specifically, the lower member 224 rests on the aligned lower sill 128, the lower sill 128 thereby substantially supporting weight of the clamp assembly 200 thereon. With weight of the clamp assembly 200 no longer supported at the ring 218, the balance member 226 drops to a lower position under its own weight. Specifically, the upper balance link 232L and the lower balance link 234L rotate about pins 230 to facilitate this drop of position of the balance member 226. As will be described below, a locking block 227L, which protrudes from the balance member 226 between the upper balance link 232L and the lower balance link 234L, correspondingly drops to a lower position. At the second stage of coupling, the lever handle 260 remains in the unclamped position.

Figure 7C:
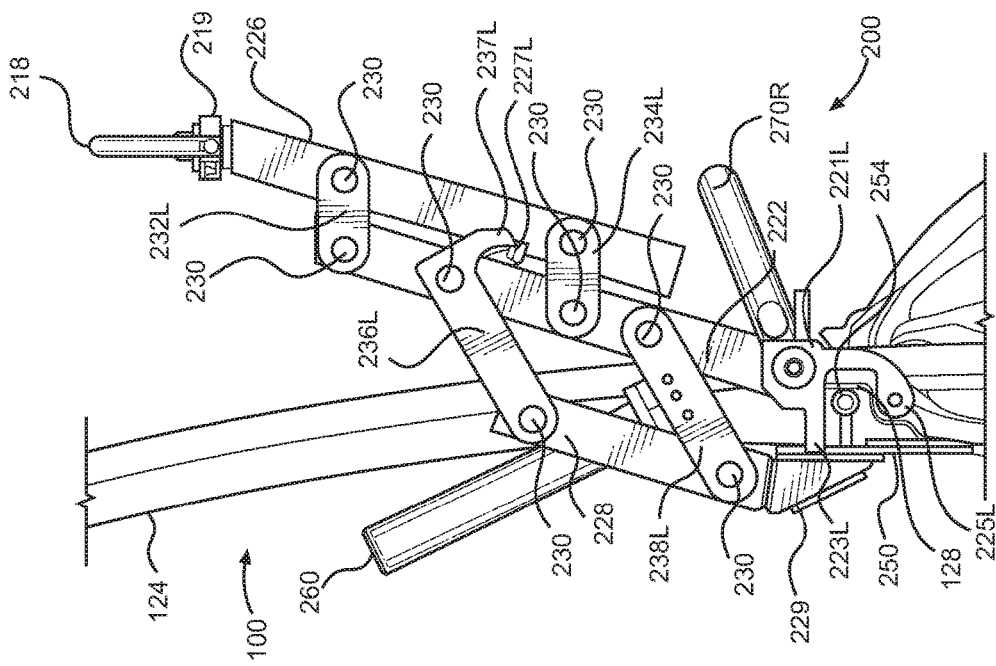
FIG. 7C is a side view of the clamp assembly without a cover in a third stage of coupling.

FIG. 7C is a side view of the clamp assembly 200 without a cover 210 in a third stage of coupling to the door 100. As shown in FIG. 7C, the clamp assembly 200 is next automatically transitioned from the unclamped state to the clamped state under the gravity load of the clamp member 228, thereby displacing the lever handle 260 from the unclamped position to the clamped position.

As described above, the air balancer is depressurized and the clamp assembly 200 is supported by the lower sill 128 of the door 100. At this stage of coupling, the gravity load of the clamp member 228 transitions the clamp assembly 200 from the unclamped state to the clamped state, moving the clamp member 228 downward toward the lower sill 128. The upper member 222 does not move under the gravity load of the clamp member 228 because the lower member 224 remains supported by the lower sill 128 because the air balancer is still depressurized. Moving the clamp member 228 causes the guard plate 250, by virtue of the mounting extension 229, to also move downward toward the lower sill 128. Specifically, the guard plate 250 is brought into contact with the interior facing side 112 of the door 128 at the lower sill 128. The secure bar 254 extending from the guard plate 250 is thereby slid into a concave portion of the lower sill 128 on the interior facing side 112 of the door 128. This concave portion into which the secure bar 254 is moved is positioned between the guide portion 223L and the clasp portion 235L on an opposing side of the door 100. Engagement by the guard plate 250 and the secure bar 254, and the guide portion 223L and the clasp portion 225L of the lower member 224 with the lower sill 128 places the clamp assembly 200 in the clamped state with the door 100. Thus, as long as the gravity load is acting on the clamp member 228, the clamp assembly 200 will remained in the clamped position and secured to the door 100.

As described above, at this stage of the coupling the clamp member 228 is moved downward toward the lower sill 128 of the door 100. This movement also causes the locking link 236L, which is connected to both the clamp member 228 and the support structure 220 by pins 230, to rotate and move downward with the clamp member 228. By moving downward toward the lower sill 128 with the clamp member 228, the locking link 236L rotates about the pin 230 connecting the locking link 236L to the upper member 222 of the support structure 220. Rotating about that pin 230 causes the hook 237L to also rotate upward away from the lower sill 128. As will be described below, this rotation of the hook 237L facilitates engagement of the hook 237L with the locking block 227 when the air balancer is subsequently pressurized, thereby securing the clamp assembly 200 in the clamped state.

Figure 7D:
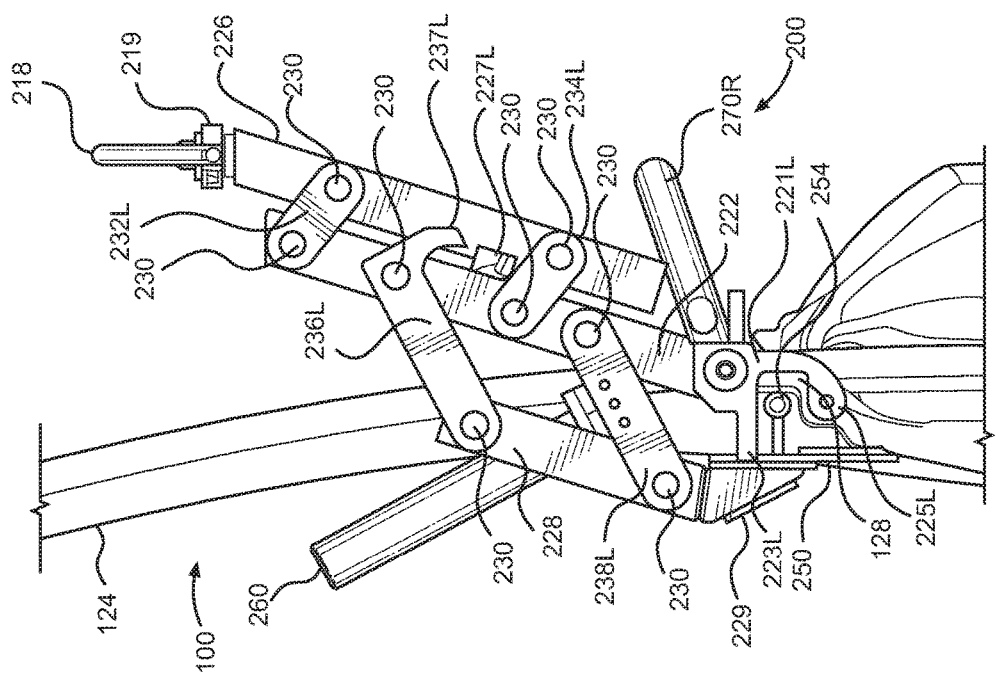
FIG. 7D is a side view of the clamp assembly without a cover in a fourth of coupling.

FIG. 7D is a side view of the clamp assembly 200 without a cover 210 in a fourth stage of coupling to the door 100. As shown in FIG. 7D, the clamp assembly 200 is next secured in the clamped state by pressurizing the air balancer.

As described above, the clamp assembly 200 is supported by the lower sill 128 of the door 100 and the clamp member 228 is in the clamped position, placing the clamp assembly 200 in the clamped state. At this stage of coupling, the air balancer is pressurized, raising the balance member 226 upward away from the lower sill 128 by the ring 218. The upper balance link 232L and the lower balance link 234L are both connected to the balance member 226 by pins 230, and therefore also move upward with the balance member 226. The upper balance link 232L and the lower balance link 234L are also connected to the upper member 222 of the support structure 220, but the upper member 222 does not move because the lower member 224 is clamped to the lower sill 128 at this stage. Thus, the upper balance link 232L and the lower balance link 234L rotate about the pins 230 in the upper member 222. As the balance member 226 is raised upward by pressurizing the air balancer, the locking block 227 protruding from the balance member 226 also moves upward. After moving upward a certain distance, the locking block 227 comes into contact with the hook 237L of the locking link 236L, which has been rotated to extend outward and toward the balance member 226. Once the locking block 227 contacts the hook 237L, the hook 237L impedes further movement of the locking block 227, thus consequently impeding further movement of the balance member 226 upward under pressurizing the air balancer. The clamp assembly 200 is now in a stage of coupling in which the lower member 224 of the support structure 220 is engaged with the lower sill 128 of the door, the clamp member 228 is in the clamped position to lock the clamp assembly 200 in the clamped state, and the air balancer is pressurized, thereby securing the locking block 227 against the hook 237L of the locking link 236L.

With the clamp assembly 200 in the above described stage of coupling to the door 100, the door 100 is securely clamped and can be released from the clamp assembly 200 only by first depressurizing the air balancer. As long as the air balancer is pressurized, and the locking block 227 in contact with the hook 237L of the locking link 236L, the clamp member 228 cannot be disengaged from the clamped position and thus the clamp assembly 200 cannot be placed into the unclamped state.

Once the air balancer is depressurized, the clamp assembly 200 can is no longer locked in place and can be disengaged from the door 100 by utilizing the lever handle 260. Particularly, the lever handle 260 can be actuated to overcome the gravity load of the clamp member 228, putting the clamp assembly 200 in the unclamped state and thereby facilitating disengagement and detachment of the clamp assembly 200 from the door 100.

Figure 8:
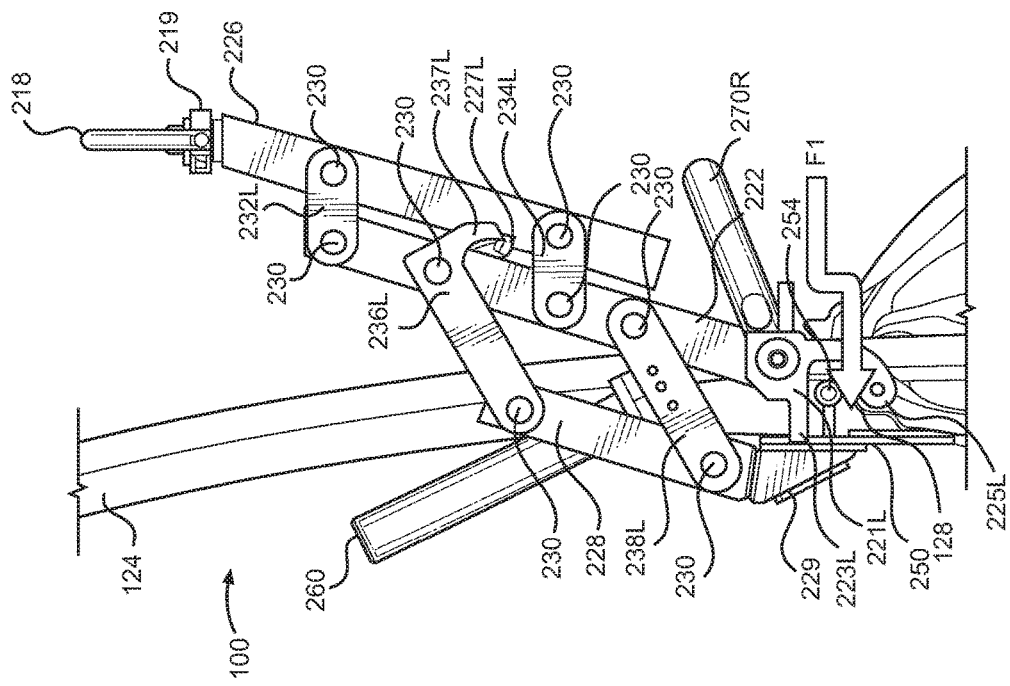
FIG. 8 is a side view of the clamp assembly without a cover in the fourth stage of coupling with free body forces shown.

FIG. 8 is a side view of the clamp assembly 100 without the cover 210 in the fourth stage of coupling of FIG. 7D, with free body force F1 shown. As shown in FIG. 8, a force F1 applied to the clamp assembly 200 represents force applied by pressurizing the air balancer to remove the gravity load of the clamp member 228 and transition the clamp assembly 200 to the unclamped state.

Figure 9:
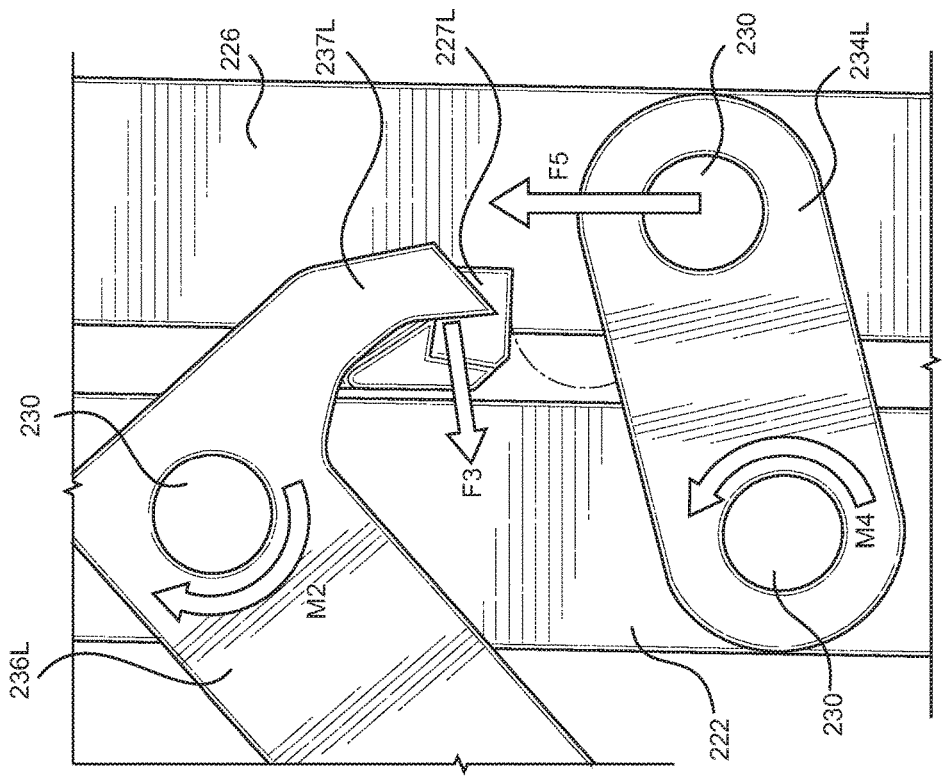
FIG. 9 is an enlarged side view of the clamp assembly without a cover in the fourth stage of coupling with free body forces shown.

FIG. 9 is an enlarged side view of the clamp assembly 200 without a cover 210 in the fourth stage of coupling of FIG. 7D with free body forces shown. This upward movement of the clamp member 228 is inhibited by the locking link 236L as it is also connected to the clamp member 228 and would need to move with upward movement of the clamp member 228. Instead, the locking link 236L cannot move upward because the hook 237L is in contact with the locking block 227 due to pressurizing the air balancer. Thus, the clamp assembly 200 is secured in the clamped position with the door 100 and can only be released by depressurizing the air balancer. Specifically, as shown in FIG. 9, the force F1 translates into a moment M2 around the pin 230 of the locking link 236L. The moment M2 is then translated into a force F3 applied on the locking block 227. An angle between a contacted face of the hook 237L of the locking link 236L and the lower balance link 234L is then such that the force F3 is translated into a moment M4. The moment M4 pushes the balance member 226 upward, thereby increasing force by which the clamp assembly 200 is secured. Thus, greater the force F1 applied to unclamp the clamp assembly 200, a force F5 upward becomes greater, ensuring the clamp assembly 200 stays secured and clamped.

IV. Alternative Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

For example, embodiments are disclosed above in the context of a clamp assembly for clamping to a door of a vehicle for assembly shown in FIGS. 1 and 7A-7D.

However, embodiments are intended to include or otherwise cover any type of clamp assembly disclosed above. For example, embodiments of the clamp assembly disclosed above can be configured to clamp to other vehicle panels such as hoods, trunks, fenders, etc. In another alternate embodiment, embodiments of the clamp assembly can also be configured to clamp directly to vehicle frames. However, the above alternative embodiments are merely provided for exemplary purposes, and as indicated above, embodiments are intended to cover any type of clamp assembly disclosed above.

Embodiments are also intended to include or otherwise cover methods of using and methods of manufacturing the clamp assembly disclosed above. The methods of manufacturing include or otherwise cover processors and computer programs implemented by processors used to design various elements of the clamp assembly disclosed above. For example, embodiments are intended to cover processors and computer programs used to design or manufacture the various components of the clamp assembly that fit to various vehicle doors and panels.

While the subject matter has been described in detail with reference to exemplary embodiments thereof, it will be apparent to one skilled in the art that various changes can be made, and equivalents employed, without departing from the scope of the invention.

What is claimed is:

1. A clamp assembly for use with an air balancer configured to clamp to a vehicle panel during assembly, the clamp assembly comprising:
    a base member configured to engage the vehicle panel from a first side;
    an upright member extending from the base member away from the vehicle panel;
    a first linkage rotatably connected to the upright member;
    a second linkage defining a hook and being rotatably connected to the upright member adjacent to the first linkage;
    a third linkage rotatably connected to the upright member adjacent to the second linkage;
    a fourth linkage rotatably connected to the upright member adjacent to the third linkage;
    an actuable lever connected to the fourth linkage and configured to rotate the fourth linkage about the upright member;
    a clamp member connected to the second linkage and the fourth linkage and configured to engage the vehicle panel from a second side opposing the first side upon actuation of the lever; and
    a balance member having a locking protrusion and being rotatably connected to the first linkage and the third linkage and configured to be connected to the air balancer, the locking protrusion configured to engage the hook of the second linkage upon pressurizing the air balancer.

2. The clamp assembly of claim 1, wherein the clamp member includes a plate-shaped surface.

3. The clamp assembly of claim 2, wherein the clamp member includes a bar extending from the plate-shaped surface configured to engage the vehicle panel from the second side.

4. The clamp assembly of claim 1, wherein the base member includes end caps at opposing ends thereof, the end caps being substantially C-shaped with upper and lower portions.

5. The clamp assembly of claim 4, wherein the upper portions of the end caps have planar lower surfaces configured to abut a top surface of the vehicle panel, and lower portions of the end caps have protrusions configured to abut a concave surface of the first side of the vehicle panel.

6. The clamp assembly of claim 1, further comprising a pair of handles extending from the base member.

7. The clamp assembly of claim of claim 6, wherein at least one of the handles includes an actuator for pressurizing the air balancer.

8. The clamp assembly of claim 1, wherein the locking protrusion is disposed between the first linkage and the third linkage.

9. The clamp assembly of claim 1, wherein the hook of the second linkage is configured to form an angle with the third linkage in a direction of elongation that is greater than 90 degrees upon pressurizing the air balancer.

10. The clamp assembly of claim 1, further comprising a datum bar configured to contact a portion of the vehicle panel to align the base member with the vehicle panel prior to engagement.

11. A clamp system for clamping a vehicle panel during assembly, the clamp system comprising:
    an air balancer configured to be pressurized and depressurized;
    a base member configured to engage the vehicle panel from a first side;
    an upright member extending from the base member away from the vehicle panel;
    a first linkage rotatably connected to the upright member;
    a second linkage defining a hook and being rotatably connected to the upright member below the first linkage;
    a third linkage rotatably connected to the upright member below the second linkage;
    a fourth linkage rotatably connected to the upright member below the third linkage;
    an actuable lever connected to the fourth linkage and configured to rotate the fourth linkage about the upright member;
    a clamp member connected to the second linkage and the fourth linkage and configured to engage the vehicle panel from a second side opposing the first side upon actuation of the lever; and
    a balance member having a locking protrusion and being rotatably connected to the first linkage and the third linkage and configured to be connected to the air balancer, the locking protrusion configured to engage the hook of the second linkage upon pressurizing the air balancer.

12. The clamp assembly of claim 11, wherein the clamp member includes a plate-shaped surface.

13. The clamp assembly of claim 12, wherein the clamp member includes a bar extending from the plate-shaped surface configured to engage the vehicle panel from the second side.

14. The clamp assembly of claim 11, wherein the base member includes end caps at opposing ends thereof, the end caps being substantially C-shaped with upper and lower portions.

15. The clamp assembly of claim 14, wherein the upper portions of the end caps have planar lower surfaces configured to abut a top surface of the vehicle panel, and lower portions of the end caps have protrusions configured to abut a concave surface of the first side of the vehicle panel.

16. The clamp assembly of claim 11, further comprising a pair of handles extending from the base member, at least one of the handles including an actuator for pressurizing the air balancer.

17. The clamp assembly of claim 11, wherein the locking protrusion is disposed between the first linkage and the third linkage.

18. The clamp assembly of claim 11, wherein the hook of the second linkage is configured to form an angle with the third linkage in a direction of elongation that is greater than 90 degrees upon pressurizing the air balancer.

19. The clamp assembly of claim 11, further comprising a datum bar configured to contact a portion of the vehicle panel to align the base member with the vehicle panel prior to engagement.

20. A method of clamping a vehicle panel comprising:
    providing a clamp assembly in an open position, the clamp assembly having an air balancer that can be pressurized and depressurized;
    aligning a first side of the vehicle panel with a first side of the clamp assembly;
    depressurizing the air balancer, causing a second side of the clamp assembly to automatically engage a second side of the vehicle panel; and
    pressurizing the air balancer, causing the clamp assembly to lock in the closed position.

* * * * *